(12) United States Patent
Fujishima et al.

(10) Patent No.: US 7,891,729 B2
(45) Date of Patent: Feb. 22, 2011

(54) SLIDING ROOF STRUCTURE AND VEHICLE EQUIPPED WITH THE SAME

(75) Inventors: Ryouta Fujishima, Yokosuka (JP); Koji Yoshida, Yokosuka (JP)

(73) Assignee: Kanto Auto Works, Ltd. (JP)

( * ) Notice: Subject to any disclaimer, the term of this patent is extended or adjusted under 35 U.S.C. 154(b) by 248 days.

(21) Appl. No.: 12/209,130

(22) Filed: Sep. 11, 2008

(65) Prior Publication Data
US 2009/0224572 A1    Sep. 10, 2009

(30) Foreign Application Priority Data
Oct. 15, 2007  (JP) .............................. 2007-268434
Oct. 23, 2007  (JP) .............................. 2007-275815

(51) Int. Cl.
B60J 7/06  (2006.01)
(52) U.S. Cl. ...................... 296/218; 296/219; 296/224; 296/37.16
(58) Field of Classification Search ................ 296/219, 296/224, 218, 37.16
See application file for complete search history.

(56) References Cited

U.S. PATENT DOCUMENTS

| | | | |
|---|---|---|---|
| 2,210,590 A | * | 8/1940 | Jobst ..................... 296/107.17 |
| 5,655,807 A | | 8/1997 | Rosario |
| 2004/0090092 A1 | * | 5/2004 | de Gaillard et al. ......... 296/222 |
| 2007/0024080 A1 | | 2/2007 | Grimm et al. |
| 2008/0174153 A1 | * | 7/2008 | Manders et al. ............. 296/224 |

FOREIGN PATENT DOCUMENTS

| | | |
|---|---|---|
| CN | 1907745 A | 2/2007 |
| JP | H02-112520 U | 9/1990 |

(Continued)

OTHER PUBLICATIONS

Chinese Office Action in counterpart application CN 200810212038. X, dated Sep. 18, 2009. The concise explanation of relevance; this Office Action rejected claims, citing foreign patent document No. 1 above.

(Continued)

Primary Examiner—Dennis H Pedder
(74) Attorney, Agent, or Firm—Chen Yoshimura LLP

(57) ABSTRACT

Providing a cover storage member 30, which constitutes the rear end of the roof of a vehicle, and a guiding means 40 for transferring the cover storage member 30 between the position at the rear end of the roof and the position inside the vehicle. The cover storage member 30 shall be equipped with a winding means for winding up the cover member. The guiding means 40 shall be equipped with rails 41 installed between the position at the rear end of the roof and the position inside the vehicle, and a transferring means for moving the cover storage member 30.

2 Claims, 19 Drawing Sheets

FOREIGN PATENT DOCUMENTS

| | | |
|---|---|---|
| JP | 06-183263 A | 7/1994 |
| JP | 2001-030761 A | 2/2001 |
| JP | 2002-046473 A | 2/2002 |
| JP | 2003-507244 A3 | 2/2003 |
| JP | 2003-160063 A | 6/2003 |
| JP | 2005-313737 A | 11/2005 |
| WO | 01-14157 A1 | 3/2001 |

OTHER PUBLICATIONS

Pending U.S. Appl. No. 12/209,085, Ryouta Fujishima, "Sliding Roof Structure and Vehicle Having the Same", filed Sep. 11, 2008.

Pending U.S. Appl. No. 12/209,114, Miyajima, et al., "Storage Structure for Storing a Cover Member of a Sliding Roof Type Vehicle and Vehicle Having the Same", filed Sep. 11, 2008.

Pending U.S. Appl. No. 12/209,121, Jun Kanamori, "Storage Structure for a Cover Member of a Sliding Roof Type Vehicle and a Vehicle Provided with the Same", filed Sep. 11, 2008.

Japanese Office Action in counterpart application JP 2007-275815, dated Aug. 18, 2009, citing foreign patent document Nos. 1-3 above.

Chinese Office Action in counterpart application CN 200810212038.X, dated Aug. 12, 2010. Concise Explanation of Relevance: This Office Action rejected claims, citing U.S. Patent No. 1 above.

\* cited by examiner

SLIDING ROOF STRUCTURE AND VEHICLE EQUIPPED WITH THE SAME

TECHNICAL FIELD

The present invention relates to a sliding roof structure for covering the opening in a roof of a vehicle with a cover.

BACKGROUND ART

In order to lighten and facilitate taking in outside air into vehicle interior, vehicle roof structures such as sunroof, open roof and sliding roof are well known. Compared with the sunroof structure, the sliding roof structure, also known as canvas top structure or open roof structure, which hereinafter called sliding roof structure in this specification, allows the roof to be opened more widely, thus providing passengers enhanced sense of openness.

As shown in FIG. 19, a part of the roof 210 of a sliding roof type vehicle 200 is cut off to form an opening 211, to which a cover member 220 is attached in openable/closable state. With this type of vehicle 200, by sliding and thus folding the cover member 220 toward the rear or the front side of the vehicle, the opening 211 is formed.

A conventional sliding roof type vehicle is disclosed in JP2003-507244A (FIGS. 1 and 2)

DISCLOSURE OF THE INVENTION

Problems to be Solved by the Invention

In order to provide passengers on a sliding roof type vehicle 200 with enhanced sense of openness, the opening 211 must be made as large as possible. However, with the conventional sliding roof type vehicles, the opening 211 cannot be made larger exceeding the limitations imposed by their manufacturing procedures, where the roof of the vehicle is replaced by a sliding roof. In addition, as shown in FIG. 19, the folded cover member 220 occupies some part of the opening 211, hampering the opening from being made larger.

The purpose of the present invention is to provide an opening larger than that of conventional sliding roof type vehicles by transferring folded cover into the vehicle.

SUMMARY OF INVENTION

This invention involves followings.

(1) A sliding roof structure for opening/closing an opening in the roof of a vehicle with a cover member comprising; a cover storage means which constitutes the rear end of the roof and stores the cover member, and a guiding means for transferring the cover storage means between a position at the rear end of the roof and a position inside the vehicle.

In this case, the cover storage means includes a winding means for winding the cover member.

The guiding means is equipped with lifting/lowering rails installed between the position at the rear end of the roof and the position inside the vehicle.

The sliding roof structure has a stopper mechanism for maintaining the cover storage means at the rear end of the roof.

Also the lifting/lowering rails are installed inclined so that the position inside the vehicle is nearer to the front than the position at the rear end of the vehicle.

(2) A sliding roof structure for opening/closing an opening in the roof of a vehicle with a cover comprising; opening/closing rails installed along the opening for guiding the transfer of the cover member, a cover member tray for holding the folded cover member, and r lifting/lowering rails for guiding the cover member tray from the roof position to the position inside the vehicle, which is under the roof position.

(3) A sliding roof structure of a vehicle comprising: an opening formed in the roof, a foldable cover member for covering the opening, opening/closing rails installed along the edge portion on the right and left sides of the opening to guide the cover member so that the cover member slides in the longitudinal direction of the vehicle, a cover member tray for holding the folded cover member, lifting/lowering rails for guiding the cover member tray so that the cover member tray moves between the first position at the rear side of the opening/closing rails and the second position under the first position, and retaining means for retaining the cover member tray at the first position in releasable state, wherein the cover member is slid and folded toward the rear side of the roof to form the opening, the entire cover member is placed on the cover, and the cover member tray is lowered from the first position to the second position inside the vehicle. opening.

The cover member tray includes a convex protruding outward in the width direction of the vehicle at the edge portion on right and left sides of the tray, the lifting/lowering rails include a guide groove along which the convex slides, the retaining means includes a protruding piece that protrudes into or retracted from the guide groove, and the convex is placed on the protruding piece to retain the cover member tray at the first position.

(4) A vehicle having one of sliding roof structure of above mentioned structure (1) to (3).

BEST MODE OF CARRYING OUT THE INVENTION

Figure 1:
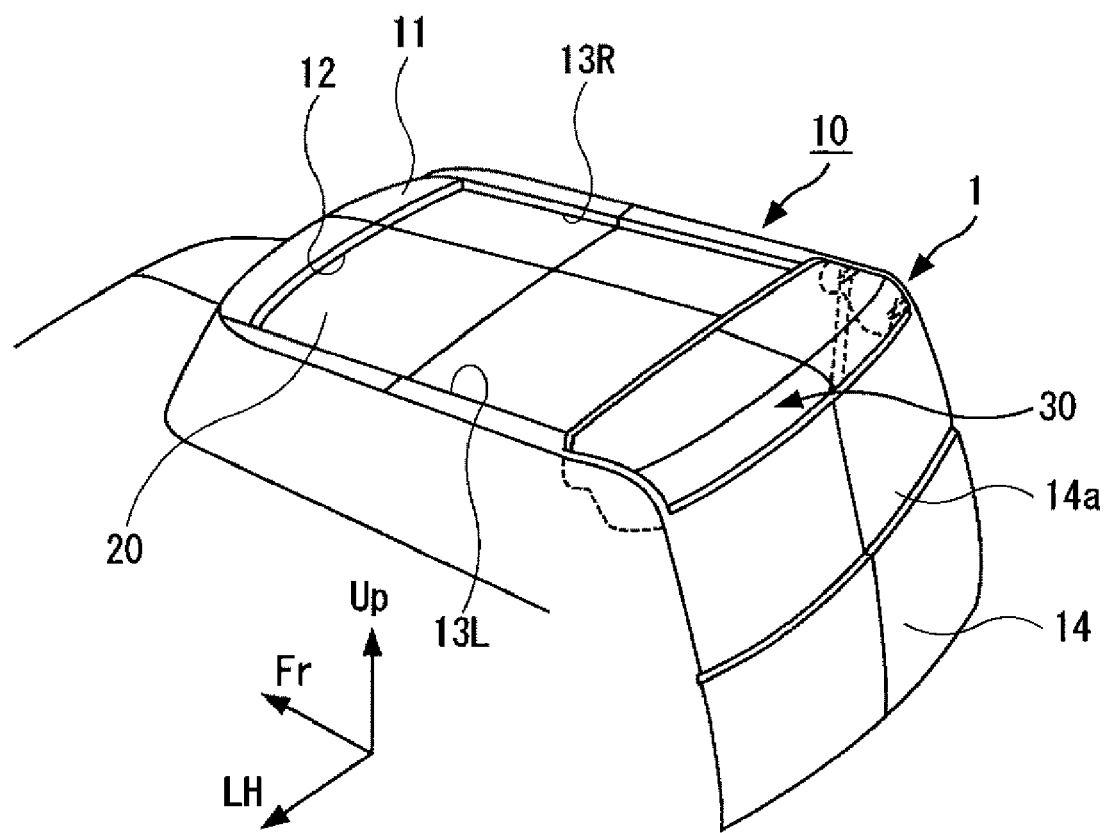
FIG. 1 is a perspective rear view of a vehicle adopting a sliding roof structure of the first embodiment of this invention.

The first embodiment of this invention is described below based on drawings. The arrow marked as "Fr" in the drawing indicates the front of the vehicle, while "Up" indicates the top and "LH" the left-hand side of the vehicle.

FIG. 1 shows a perspective view of a hatchback type vehicle (10) featuring a sliding roof structure of the first embodiment of this invention.

This vehicle 10 has an opening 12 in its roof 11. The opening 12 has been formed by cutting the area from the rear to the front of the roof in an arch-like shape, with the edges on both sides left as they are. This opening 12 can be covered with a cover 20, or left open. The first rails 13L and 13R for transferring the cover 20 are installed along the right and left edges of the opening 12, which extend in the longitudinal direction of the vehicle.

Figure 2:
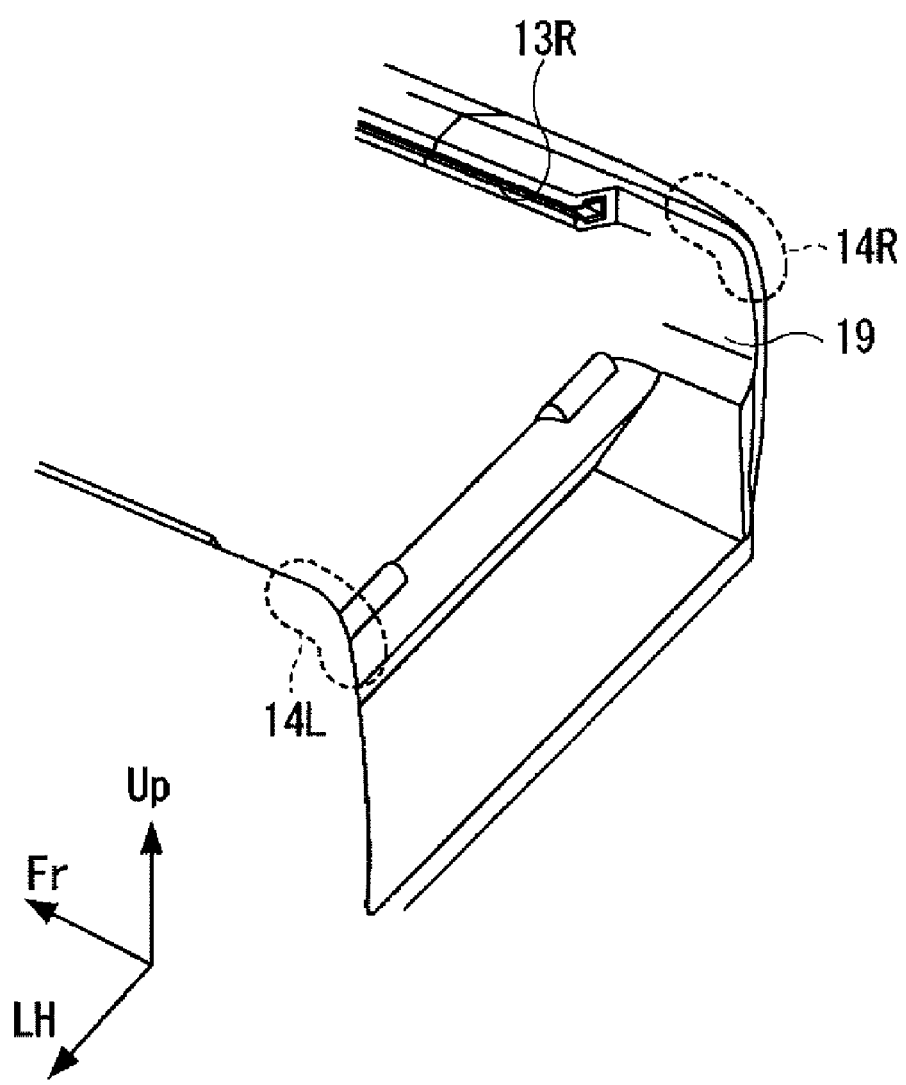
FIG. 2 is a schematic perspective view of the rear part of the vehicle shown in FIG. 1.

The roof 11 of the vehicle 10 of the first embodiment of this invention has been cut in a gate-like shape, and as shown in FIG. 2, there is nothing between the right and left rear corners 14L, 14R of the roof. As shown in FIG. 1, a cover storage member 30 is provided between both corners 14L, 14R. This cover storage member 30 constitutes the rear edge of the roof 11. In FIG. 2, the rear door and rear window glass are not shown.

Figure 3:
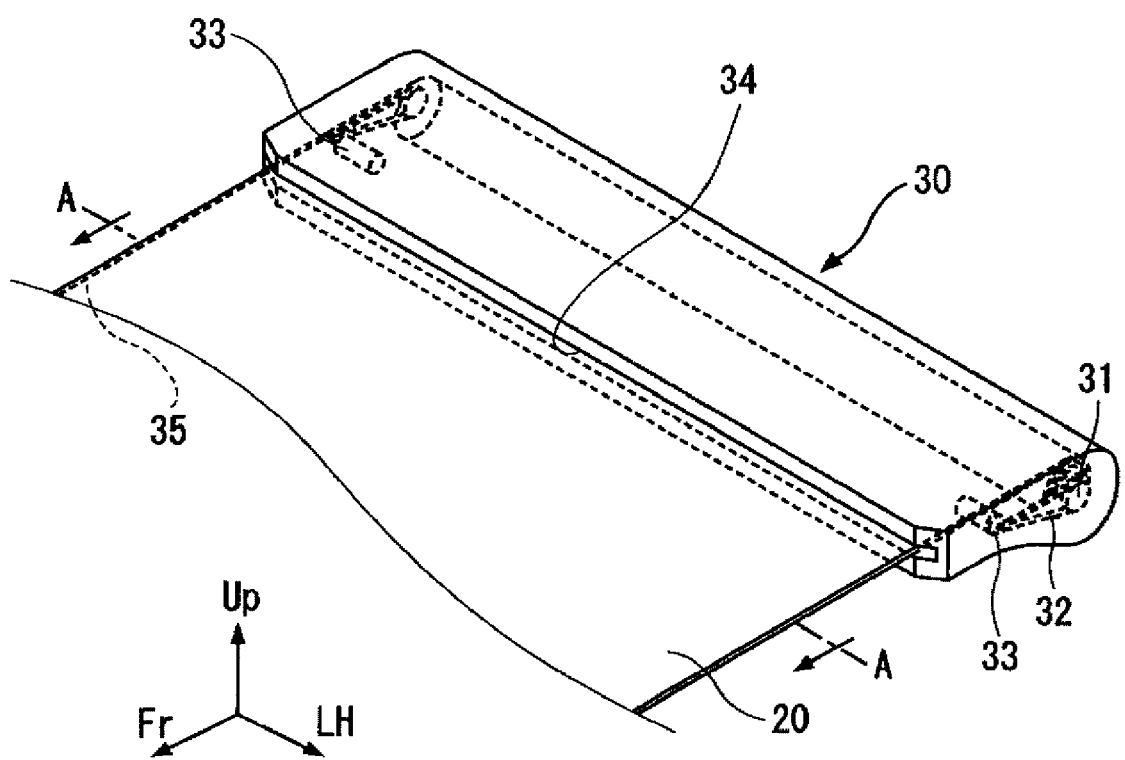
FIG. 3 is a perspective view of a cover storage member of the first embodiment of this invention.
Figure 4:
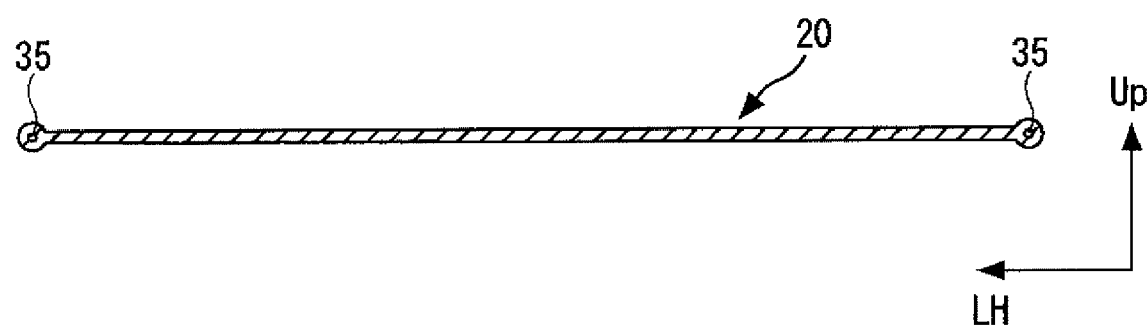
FIG. 4 is a cross-sectional view viewed from A-A in FIG. 3.

FIG. 3 is a perspective view of the cover storage member 30 provided with a space for storing the cover. A shaft 31, to which one end of the cover 20 is fastened, and a motor 33 for rotating the shaft 31 via a belt 32 are provided within the storage space. FIG. 4 is a cross-sectional view viewed from A-A in FIG. 3. A wire 35 is attached to the both ends of the cover 20, and one end of the wire 35 is fastened to the shaft 31. The wire 35 is sent from the entrance 34 of the cover storage member 30 toward the front of the roof along the first rails 13L, 13R by normal rotation of the motor 33. The cover stretches over the roof 11, following the movement of the wire 35, thus covering the opening 12. On the other hand, reverse rotation of the motor 33 winds up the cover 20 stretched over the roof 11 along with the wire 35, thus forming the opening 12.

Figure 5:
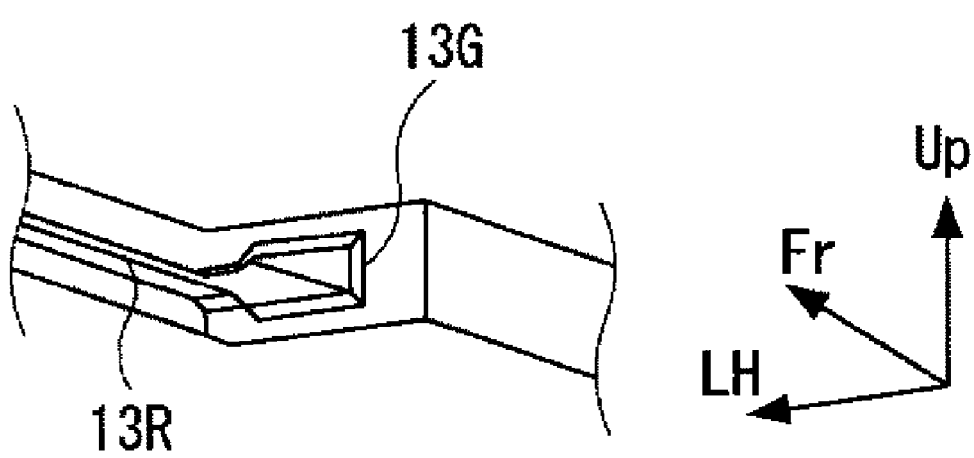
FIG. 5 is a perspective view showing the rear end of the first rail of the first embodiment of this invention.

As shown in FIG. 5, the edge of the insertion slot 13G at the rear end of the first rail 13R is chamfered so that the cover 20 sent from the entrance 34 of the cover storage member 30 enters the first rails 13L, 13R smoothly.

As shown in FIG. 1, in a state in which the rear window glass 14a of the rear door 14 is closed, the top edge of the rear window glass 14a contacts the rear edge of the cover storage member 30 in sealed state or water tight. The bottom face of the cover storage member 30 constitutes a part of the ceiling of the vehicle.

Figure 6:
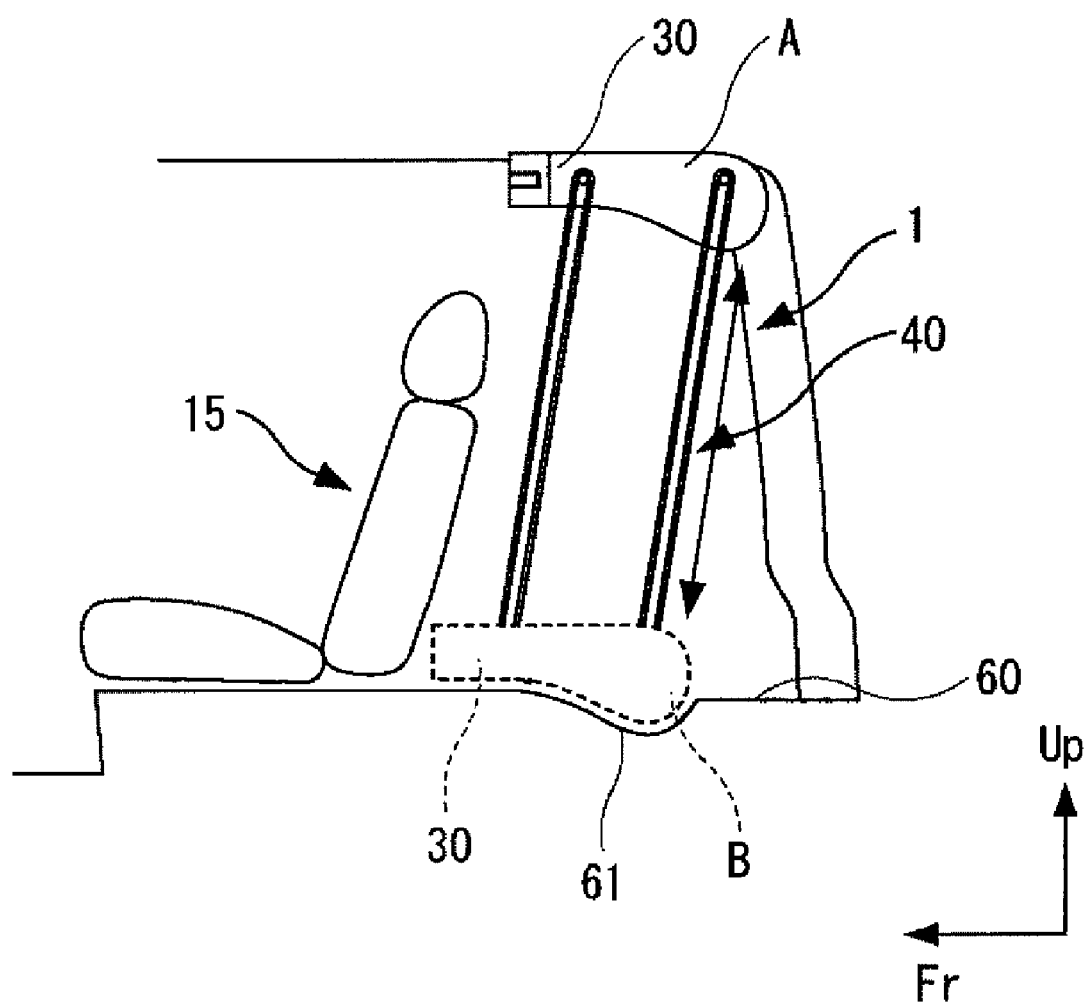
FIG. 6 shows the sliding roof structure of the first embodiment of this invention.

Furthermore, as shown in FIG. 6, the sliding roof structure of the first embodiment of this invention is designed to allow the cover storage member 30 to move from the position at the rear edge of the roof, hereafter referred to as position A, to the position on the deck shown by dotted line at the back of the rear seat 15, hereafter referred to as position B.

Figure 7:
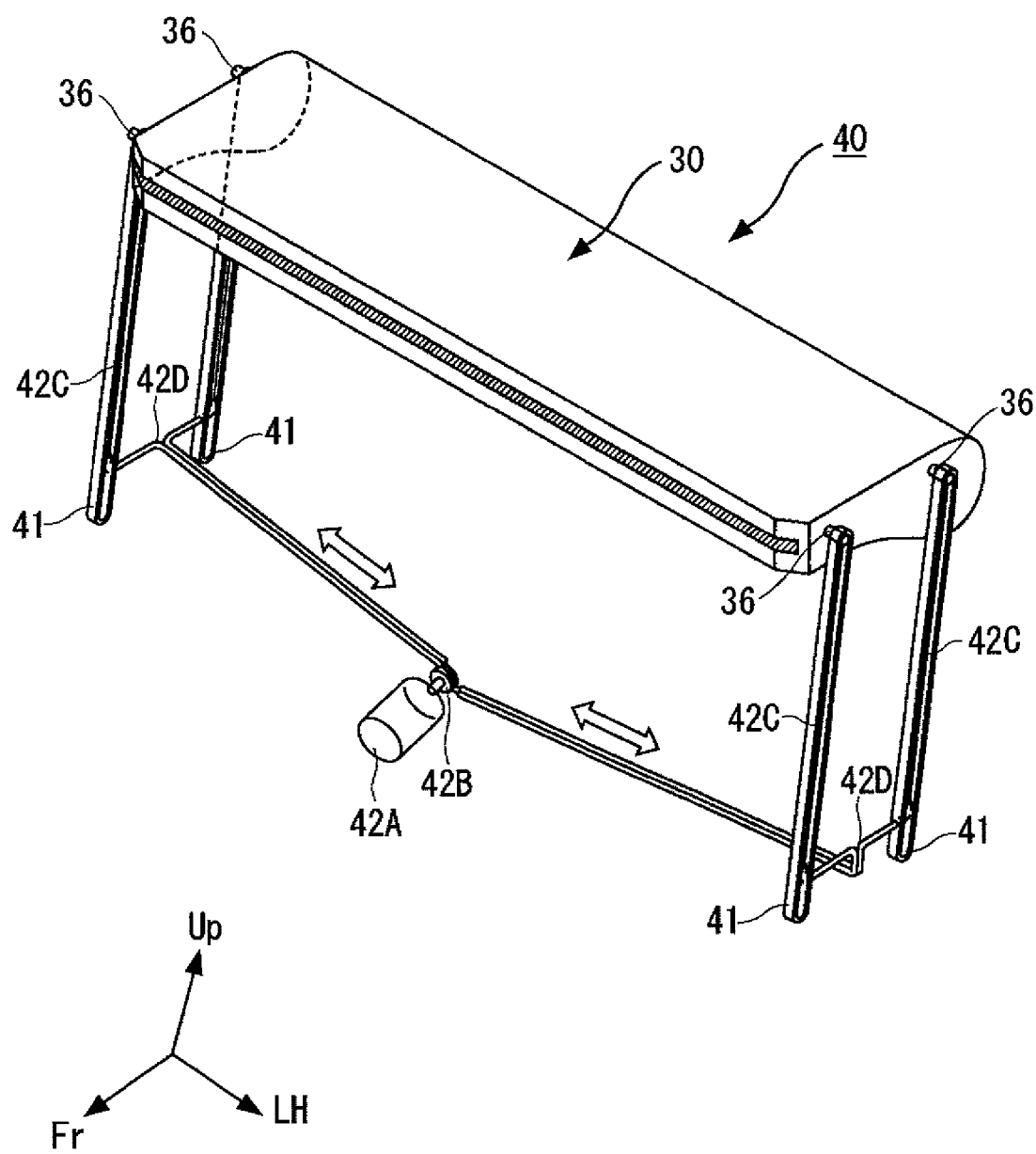
FIG. 7 is a perspective view showing the sliding roof structure of the first embodiment of this invention.

To achieve this, the sliding roof structure 1 of this invention is equipped with a guiding means 40 for transferring the cover storage member 30 between position A and position B, as shown in FIG. 6. As shown in FIG. 7, this guiding means 40 is equipped with second rails 41, which are installed between position A and position B to move the cover storage member 30 up and down, and a transferring means 42 for moving the cover storage member 30.

The second rails 41 installed on the inner walls 19 (see FIG. 2) at the rear of the vehicle extend in the vertical direction. In the first embodiment of this invention, two rails 41 are laid apart from each other in the longitudinal direction of the vehicle on the right and left sides of the vehicle. In order for the cover storage member 30 to move along the second rails 41, a convex protruding outward in the width direction of the vehicle is provided on the right and left edges of the cover storage member 30 as shown in FIG. 7. In the first embodiment of this invention, two convexes 36, 36 are provided apart from each other in the longitudinal direction of the vehicle. These convexes 36 are slid along and supported by the second rails 41, which allows the cover storage member 30 to move up and down.

As shown in FIG. 7, the cover storage member 30 moves up and down along the second rails 41 via the transferring means 42. The transferring means 42 is comprised of a motor 42A, pulley 42B mounted to the rotating shaft of the motor 42A, wire 42C sent from the pulley 42 via normal rotation of the motor 42A and rewound around the pulley 42B via reverse rotation of the motor 42A, and tube 42D for guiding the wire 42C. As shown in FIG. 7, the edges of the tube 42D are attached to the lower part of the second rails 41, and the wire 42C coming out of the tube 42D passes within the second rails 41 and connected to the convex 36 provided at the edges of the cover storage member 30, which slides along the second rails 41, from the bottom. By controlling the length of the wire 42C on the second rails 41 with the motor 42A, the cover storage member 30 moves up and down.

Figure 8:
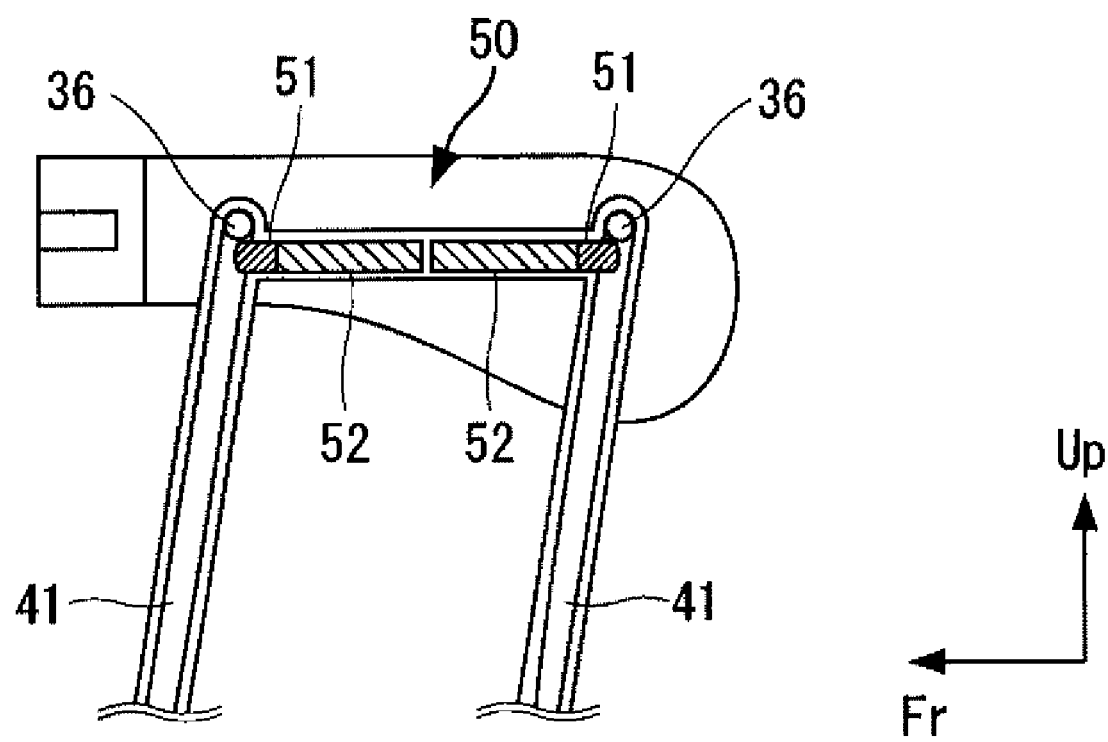
FIG. 8 shows a stopper mechanism of the first mechanism of this invention.

Furthermore, the first embodiment of this invention is equipped with a stopper mechanism 50, which prevents the cover storage member 30 from going down when it is at position A. As shown in FIG. 8, locking members 51 for locking the convexes 36 at the top of the second rails 41 are installed at the top of the second rails 41, in a state in which the locking members 51 are protruded into or retracted from the second rails 41, and normally kept protruded with the repulsive force of springs 52.

If force is applied to move the cover storage member 30 downward, resisting the repulsive force of the springs 52, in a state in which downward movement is restricted by the stopper mechanism 50 as shown in FIG. 8, the convex 36 moves downward, pushing aside the locking member 51, thus allowing the cover storage member 30 to come down and be placed on the surface of the deck as shown in FIG. 6. The deck 60 is provided with a concave 61 for partially embedding the cover storage member 30.

The operation of the sliding roof structure 1 of the first embodiment of this invention is described below.

Figure 9:
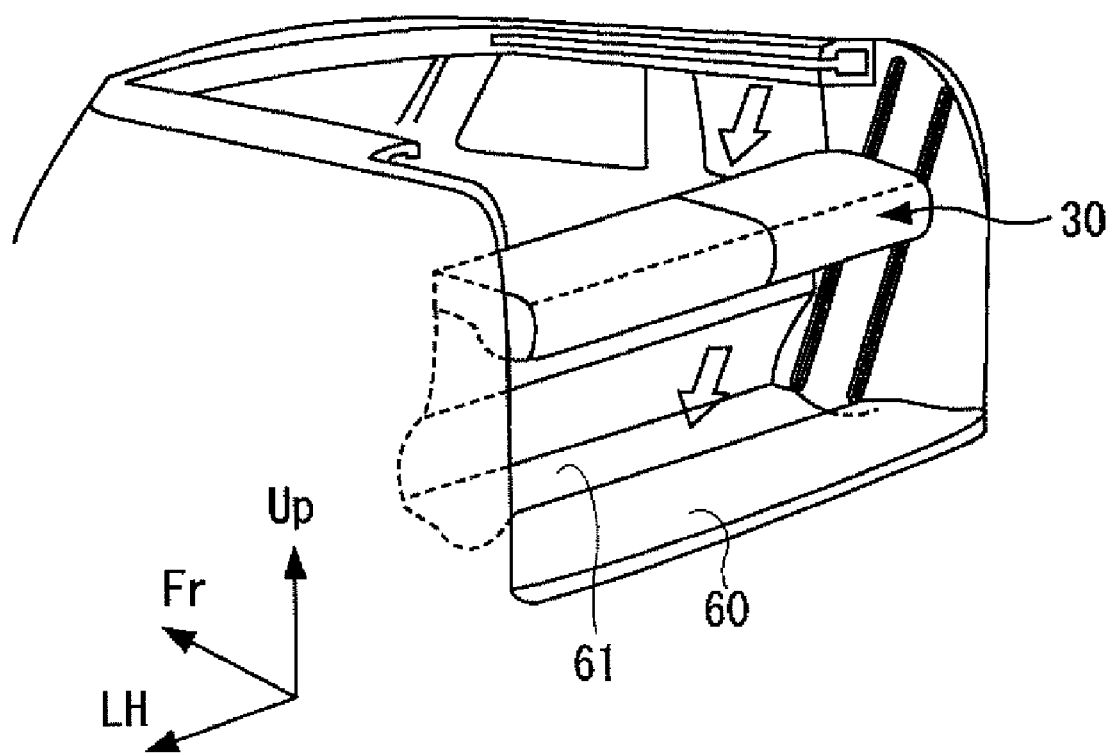
FIG. 9 is a perspective view for describing the operation of a sliding roof structure of the first embodiment of this invention.

To form an opening 12 in the roof 11, the front part of the cover 20 is slid toward the back of the vehicle as in the case of conventional sliding roof type vehicles. In this case, reverse rotation of the motor 33 installed within the cover storage member 30 winds the cover 20 up around the shaft 31, and thus the cover 20 is stored in the cover storage member 30. The position of the cover storage member 30 is controlled by the stopper mechanism 50 so that it is maintained at position A. If a user operates the in-vehicle switch to drive the transferring means 42, the motor 42A is actuated to wind up the wire 42C around the pulley 42B, thus applying force for transporting the cover storage member 30 downward. Consequently, the convex 36 pushes aside the locking member 51, thus allowing the cover storage member 30 to move downward from position A to position B as shown in FIG. 9. The rear window glass 14a must be lowered slightly before lowering the cover storage member 30.

The above procedure is reversed to move the cover 20 stored at position B upward and stretch it over the roof.

With the sliding roof structure 1 designed to operate as shown above, the cover 20 wound up as a result of forming the opening 12 in the roof 11 can be transferred from the position on the roof 11 to inside the vehicle. Consequently, since the cover does not occupy a part of the roof 11, unlike conventional sliding roof structures, the opening 12 can be made larger. Meanwhile, since the cover 20 is wound up within the cover storage member 30, it is not visible through the rear window glass 14a even if it is transferred to inside the vehicle.

In addition, in the first embodiment of this invention, since the top edge of the rear window glass 14a is configured to directly contact the cover storage member 30 at position A, a larger opening is formed by lowering the cover storage member 30 together with the rear window glass 14a.

The first embodiment of this invention is described above. Various embodiments are allowed without departing from the scope of the invention. The above description applies to the configuration in which the second rails extend from position A to position B, which is lower and slightly to the front of the vehicle than position A. However, position B may be directly below position A.

The second embodiment of this invention is described below based on the drawings.

The arrow marked as "Fr" in the drawing indicates the front of the vehicle, while "Up" indicates the top and "LH" the left-hand side of the vehicle.

Figure 10:
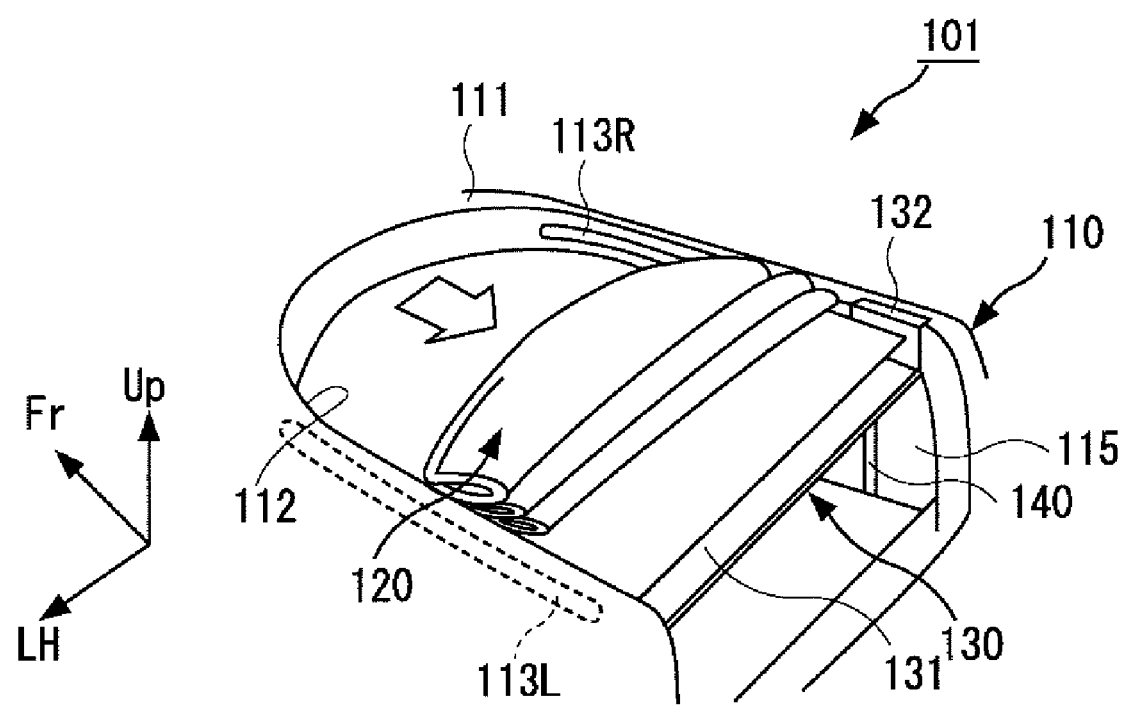
FIG. 10 is a perspective view showing the rear part of a vehicle adopting a sliding roof structure of the second embodiment of this invention.

FIG. 10 shows a perspective view of a hatchback type vehicle 110 featuring a sliding roof structure 101 of the second embodiment of this invention.

The vehicle 110 has an opening 112 in its roof 111. The opening 112 has been formed by cutting the area from the rear to the front of the roof in an arch-like shape, with the edges on both sides left as they are. This opening 112 can be covered by a cover 120, or left open.

The cover 120 is equipped with multiple rods (not shown), which extend outward in the width direction, placed at specified intervals in the longitudinal direction of the vehicle. The tip of each rod protrudes from the right or left edge of the cover 120 outwards in the width direction of the vehicle. The first rails 113L and 113R for guiding the tip of these rods are provided along the right and left edges, which extend in the longitudinal direction of the vehicle, of the opening 112 respectively.

The cover 120 is supported by and slides along the first rails 113L and 113R. The cover 120 is folded through a process in which the cloth between rods adjacent to each other is folded when the front and the rear edges of the cover 120 are moved closer to each other. By folding the cover 120 while moving it toward the rear side of the vehicle, an opening 112 is formed.

Figure 11:
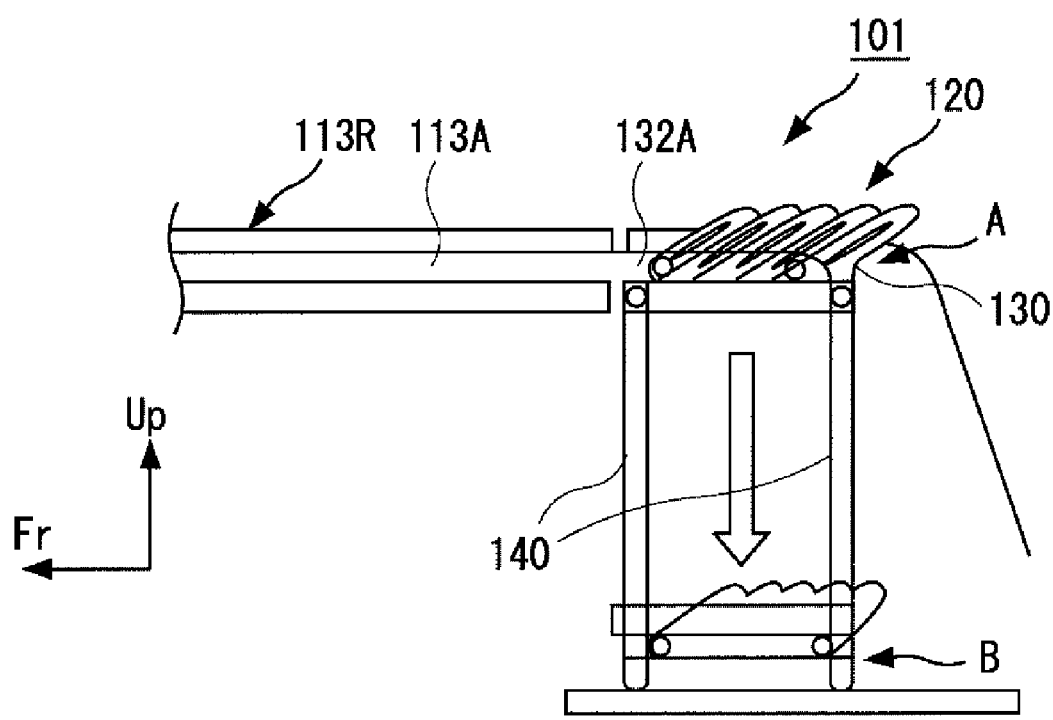
FIG. 11 is a schematic cross-sectional view of the rear part of the vehicle shown in FIG. 10.

Furthermore, as shown in FIG. 11, the sliding roof structure 101 in the second embodiment of this invention is configured to allow the cover 120 to move from the roof surface to inside the vehicle. To achieve this, the sliding roof structure 101 of this invention is equipped with a tray for the cover 130, second rails 140, and a retaining means 150 (see FIG. 13).

Figure 13:
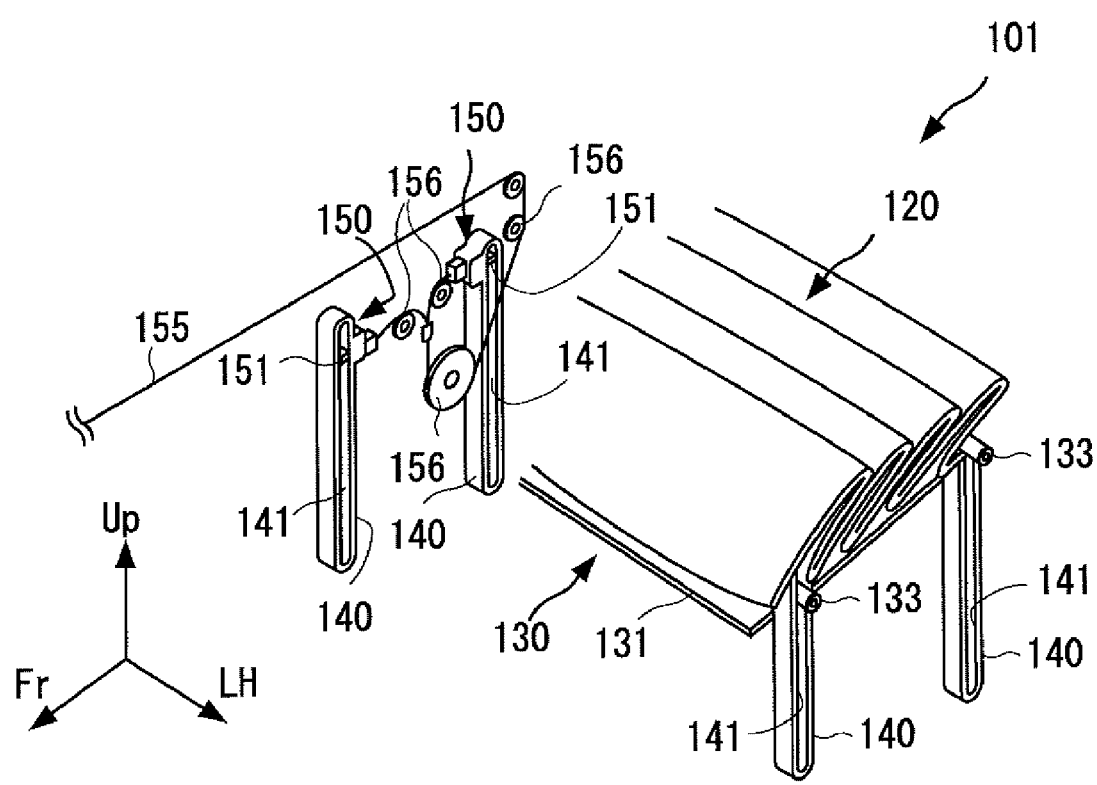
FIG. 13 is a perspective of the retaining means in the sliding roof structure shown in FIG. 10.

As shown in FIG. 13, the tray for the cover 130 is used for placing the cover on it in folded state for transportation. As shown in FIG. 11, the tray for the cover 130 moves between position A, the rear end of the first rail 113R laid in horizontal direction, and position B, the second position that is lower than position A.

As shown in FIG. 10, the tray for the cover 130 is provided with a base plate 131, whose long sides extend in the width direction of the vehicle, and extension rails 132, 132 installed at the right and left sides of the base plate 131. The dimensions of the base plate 131 are determined so that it extends horizontally under the entire area of folded cover.

The extension rails 132, 132 are used for guiding the tips of the rods, which protrude from the right and left edges of the cover 120, respectively. In a state in which the tray for the cover 130 is retained at the first position (A) (FIG. 11) by the retaining means 50, which is to be described later, the extension rails 132, 132 are placed behind the first rails 113L, 113R at the same height as the first rails (113L, 113R). Furthermore, extension guide grooves 132A, which are connected to the guide grooves 113A of the first rails 113L, 113R in a state in which the tray for the cover 130 is retained at the first position (A), are formed on the extension rails 132, 132, as shown in FIG. 11. The edge of each rod is transferred along these guide grooves 113A, 132A. The rod mounted to the back end of the cover 120 is fastened to the tray for the cover 130. The extension guide groove 132A of the extension rail 132 extends to the middle of the extension rail 132 slightly to the rear of the vehicle, and the rod mounted to the rear end of the cover 120 are fastened at the position of the rear end of this extension guide groove 132A.

Figure 12:
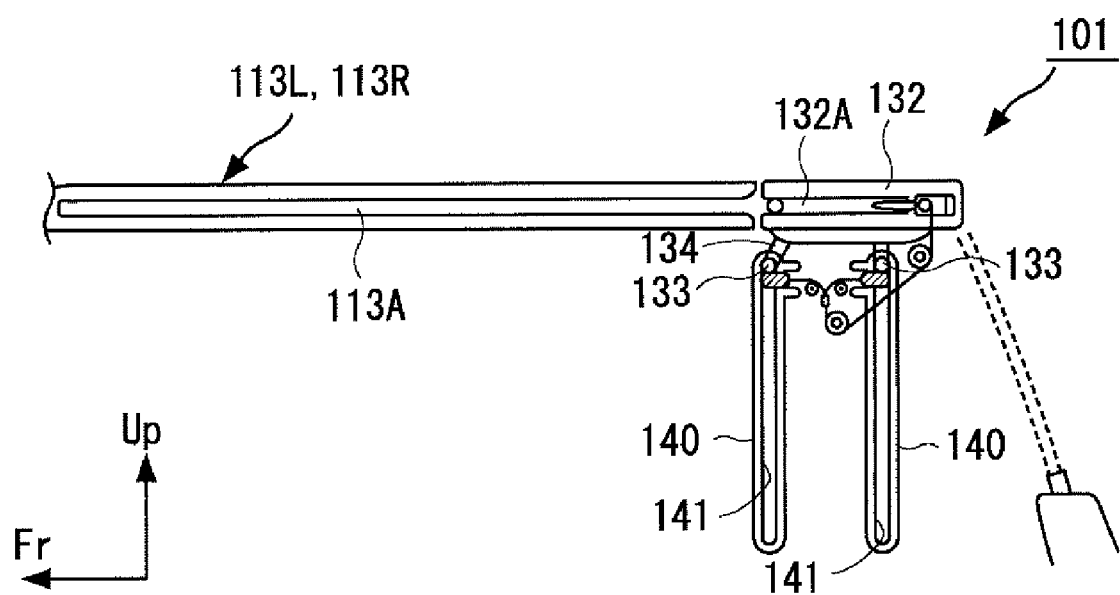
FIG. 12 is a schematic cross-sectional view of the rear part of the vehicle shown in FIG. 10.

As shown in FIG. 12, a convex protruding outward in the width direction of the vehicle is provided at the right and left sides of the tray for the cover 130. The convex 133 is mounted to the base plate 131 via a bracket 134. In the second embodiment of this invention, two convexes 133, 133 are provided apart from each other in the longitudinal direction of the vehicle.

To guide and support these convexes 133, 133, the second rails 140 installed on the inner wall 115 at the rear of the vehicle extend in the vertical direction. For each of the convex installed on both sides of the tray for the cover 130, two rails 140, 140 each are laid apart from each other in the longitudinal direction of the vehicle on the right and left sides of the vehicle.

A guide groove 141 for guiding the convex is formed along the longitudinal direction of the second rails 140, 140. By sliding the convex 133 along the guide groove 141, the tray for the cover 130 is moved up or down. In the second embodiment, the dimensions of the second rails 140, 140 are determined, and the second rails 140, 140 are mounted to a desired position on the internal wall 115, so that the tray for the cover 130 can be transferred vertically, guided by the second rails 140, from the first position (A), which is on the surface of the roof, to the second position (B), the position within the vehicle directly below the first position (A).

As shown in FIG. 13, a retaining means 150 is used for retaining the tray for the cover 130 at the top of the second rails 140, in a state where the cover can be released. The tray for the cover 130 is retained at the first position (A) with the retaining means 150. For that purpose, the retaining means 150 is equipped with a protruding piece 151, which can be protruded into or retracted from the guide groove 141 of the second rail 140.

Figure 14:
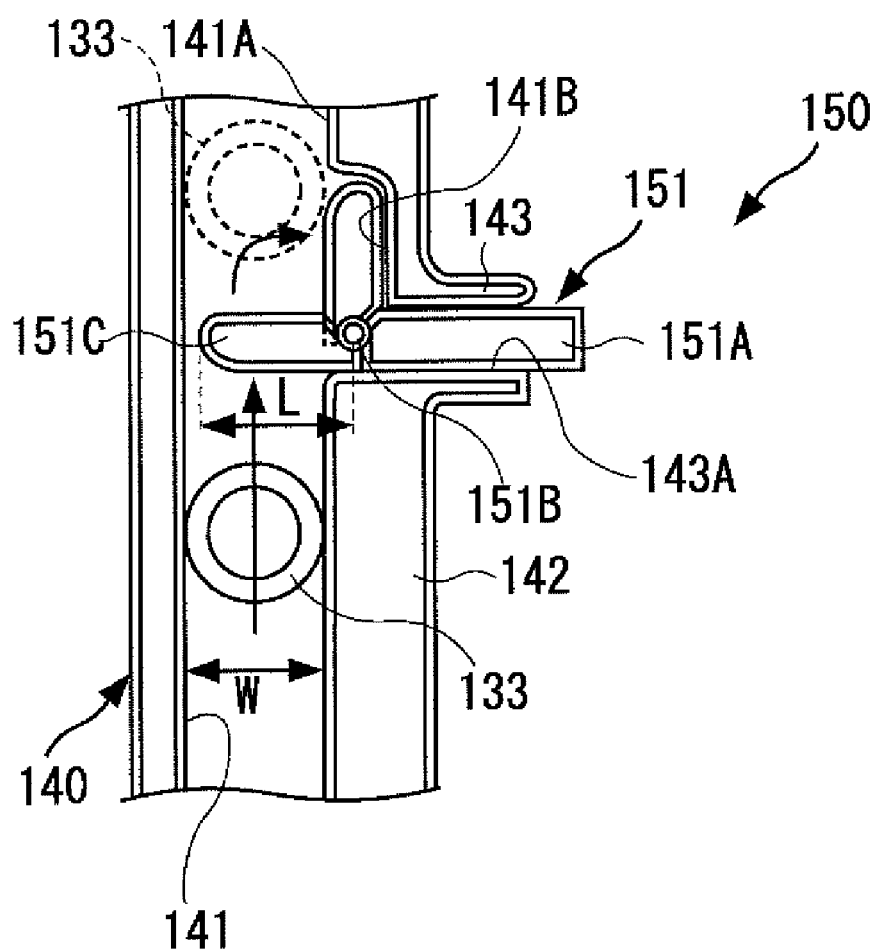
FIG. 14 is a side view of the retaining means in the sliding roof structure shown in FIG. 10.
Figure 15:
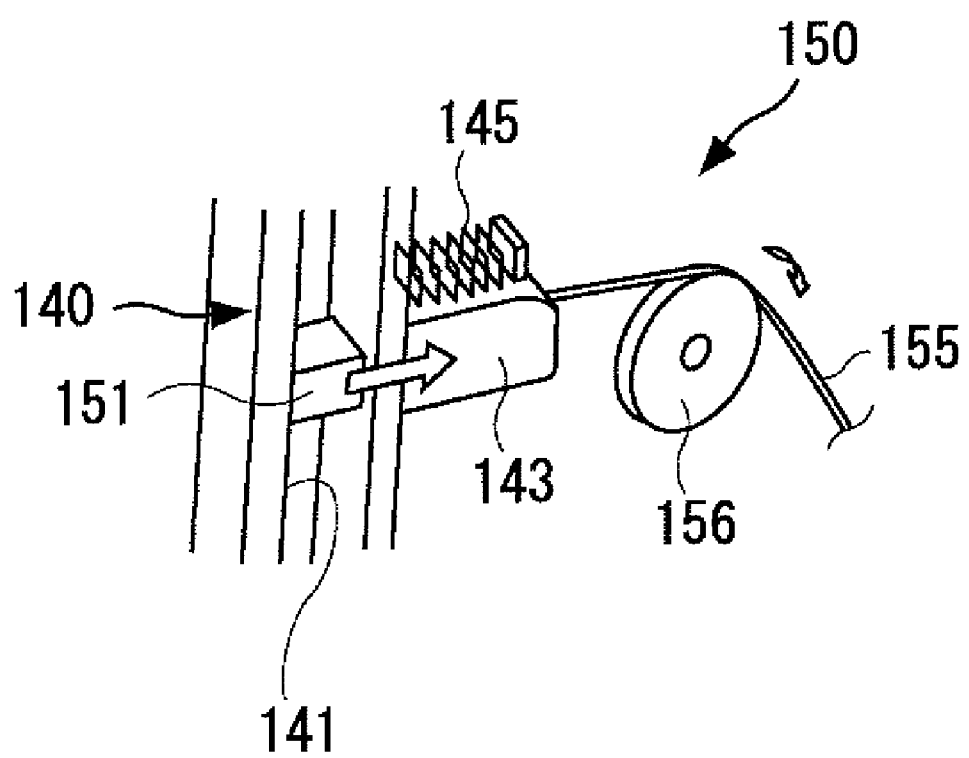
FIG. 15 is a perspective of the retaining means shown in FIG. 14.

As shown in FIG. 14, the protruding piece 151 is comprised of a base 151A and a rotating part 151C, which is mounted to the base 151A in rotatable state via a hinge 151B. The base 151A moves within a cylindrical part 143, which is integrated in the side wall 142 of the guide groove 141. Furthermore, as shown in FIG. 15, the base 151A is forced to move toward the guide groove 141 with a spring 145. The cylindrical part 143 is formed with its shaft extended in the direction orthogonal to the longitudinal direction of the guide groove 141. The base 151A moves within the cylindrical part 143 to make the rotating part 151C, which is installed at the edge of the base 151A, protrude into or retract from the guide groove 141. The length (L) of the rotating part 151C is made longer than the width (W) of the guide groove 141 (see FIG. 14), and consequently, when the rotating part 151C is protruded into the guide groove 141, its connecting part with the base 151A is placed on the guiding surface 143A of the cylindrical part 143. Furthermore, a concave 141B for housing the rotating part 151C is provided on the surface 141A of the guide groove 141 above the guiding surface 143A The rotating part 151C of the protruding piece 151 is rotated upward and then housed in the concave 141B. The depth and shape of the concave 141B is determined so that the rotating part 151C is housed flash with the surface of the guide groove 141.

With this retaining means 150, when the convex 133 is placed on the upper surface of the protruding piece 151, which protrudes into the guide groove 141, the tray for the cover 130 is retained at the first position (A). Meanwhile, as shown in FIG. 14, when the convex 133 moves from under toward the protruding piece 151 and touches the protruding piece 151, which protrudes into the guide groove 141, the rotating part 151C of the protruding piece 151 rotates upward, thus ensuring the upward movement of the convex 133.

Furthermore, as shown in FIGS. 13 and 15, a wire 155 is connected to the protruding piece 151, and the other end of the wire is connected to a switching device (not shown) installed within the vehicle via a pulley 156. The switching device integrates a motor, for example, and the motor winds up the wire 155 to retract the protruding piece 151 of the retaining means 150 from the guide groove 141. This structure allows the convex 133 placed on the upper surface of the protruding piece 151 to move downward when the protruding piece 151 is retracted from the guide groove 141, and thus the tray for the cover 130 can move downward.

Figure 16:
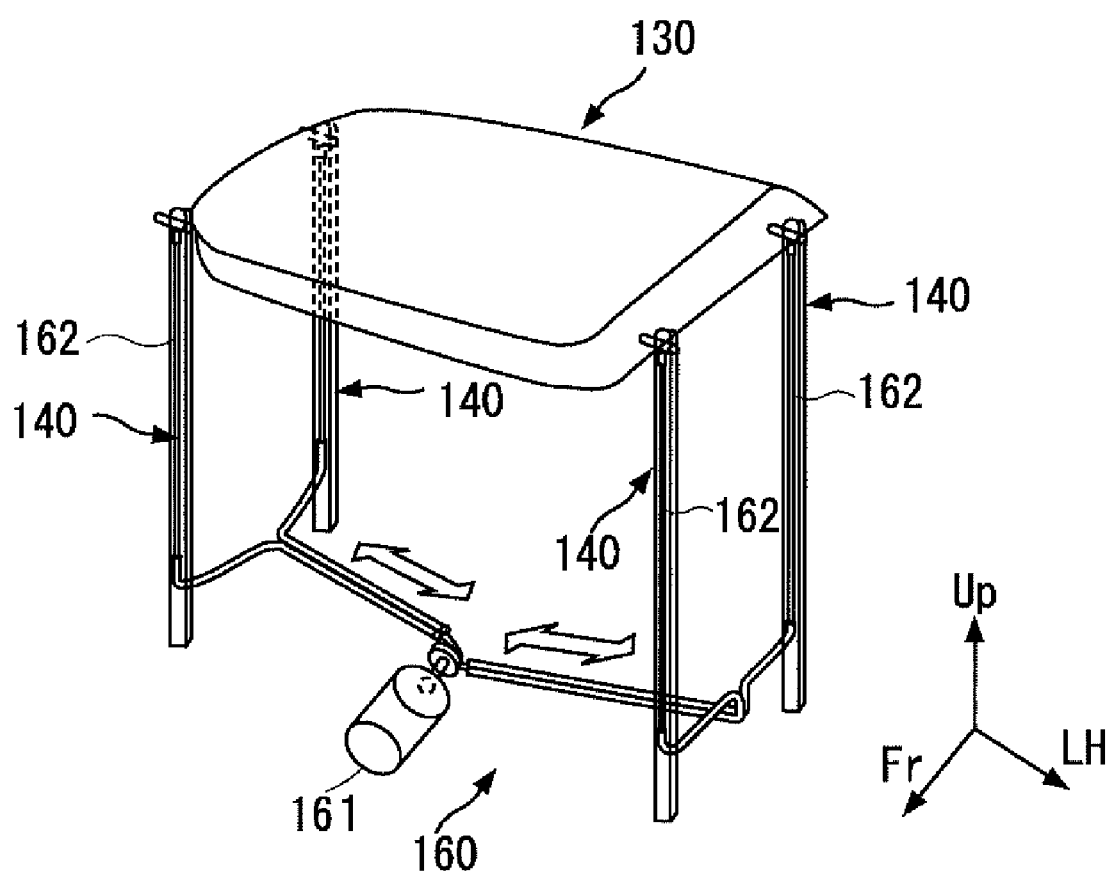
FIG. 16 is a perspective view of the lifting and lowering device in the sliding roof structure shown in FIG. 10.

The tray for the cover 130 is moved up or down along the second rails 140 with a lifting and lowering device 160 shown in FIG. 16. The lifting and lowering device 160 is equipped with a motor 161 and two pairs of wires 162 connected to the motor 161. The end of a pair of wires 162, 162 is attached on the right and left sides of the tray for the cover 130 at positions away from each other in the longitudinal direction of the vehicle. The motor 161 controls the length of the wire 162, thus lifting or lowering the tray for the cover 130. The tray for the cover 130 is shown schematically in FIG. 16.

Figure 17:
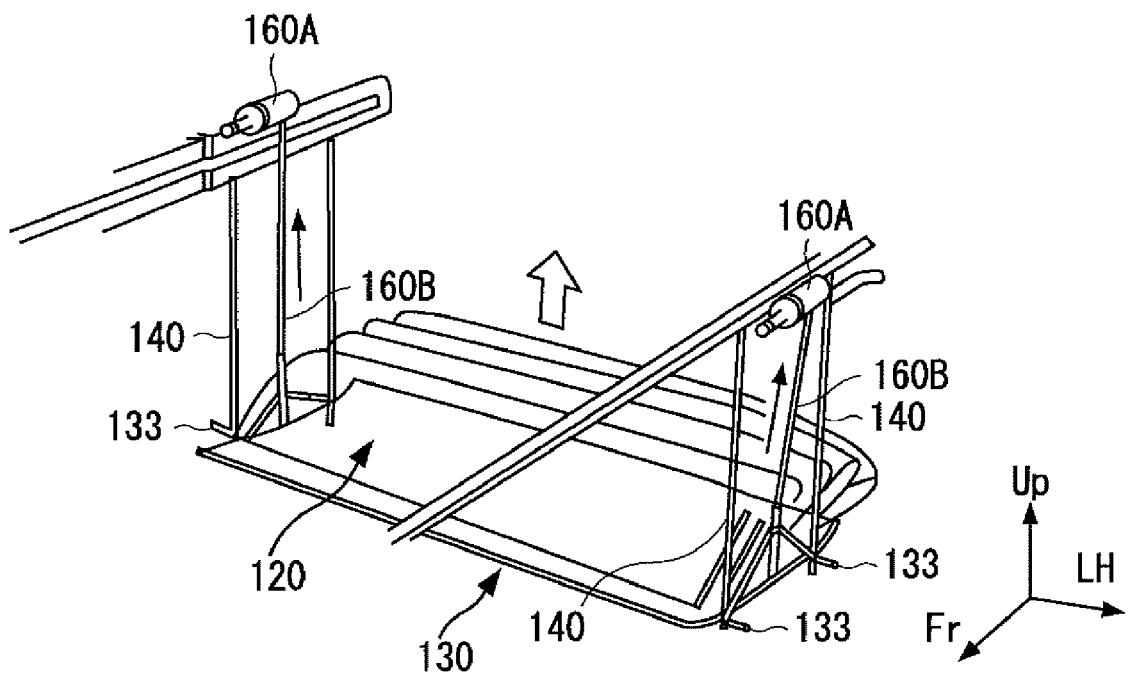
FIG. 17 is a perspective view of another lifting and lowering device in the sliding roof structure shown in FIG. 10.

Instead of providing the lifting and lowering device 160, the tray for the cover 130 can be lifted by winding up the wire 160B connected to the convex 133 with a motor 160A installed at the position adjacent to the surface of the roof at the rear part of the vehicle, as shown in FIG. 17.

Figure 18:
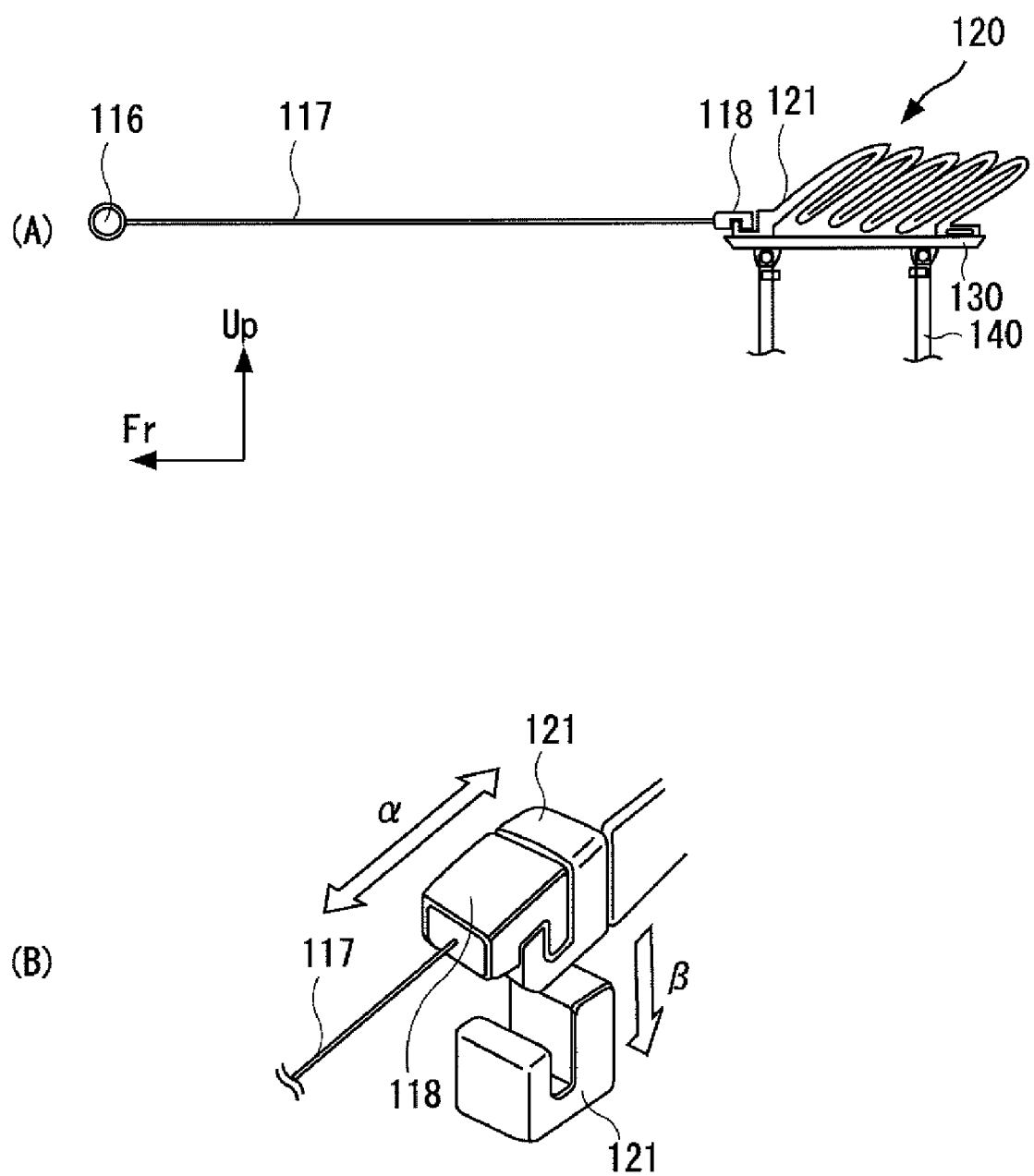
FIG. 18 shows a mechanism for sliding the cover in the sliding roof structure in FIG. 1.
Figure 19:
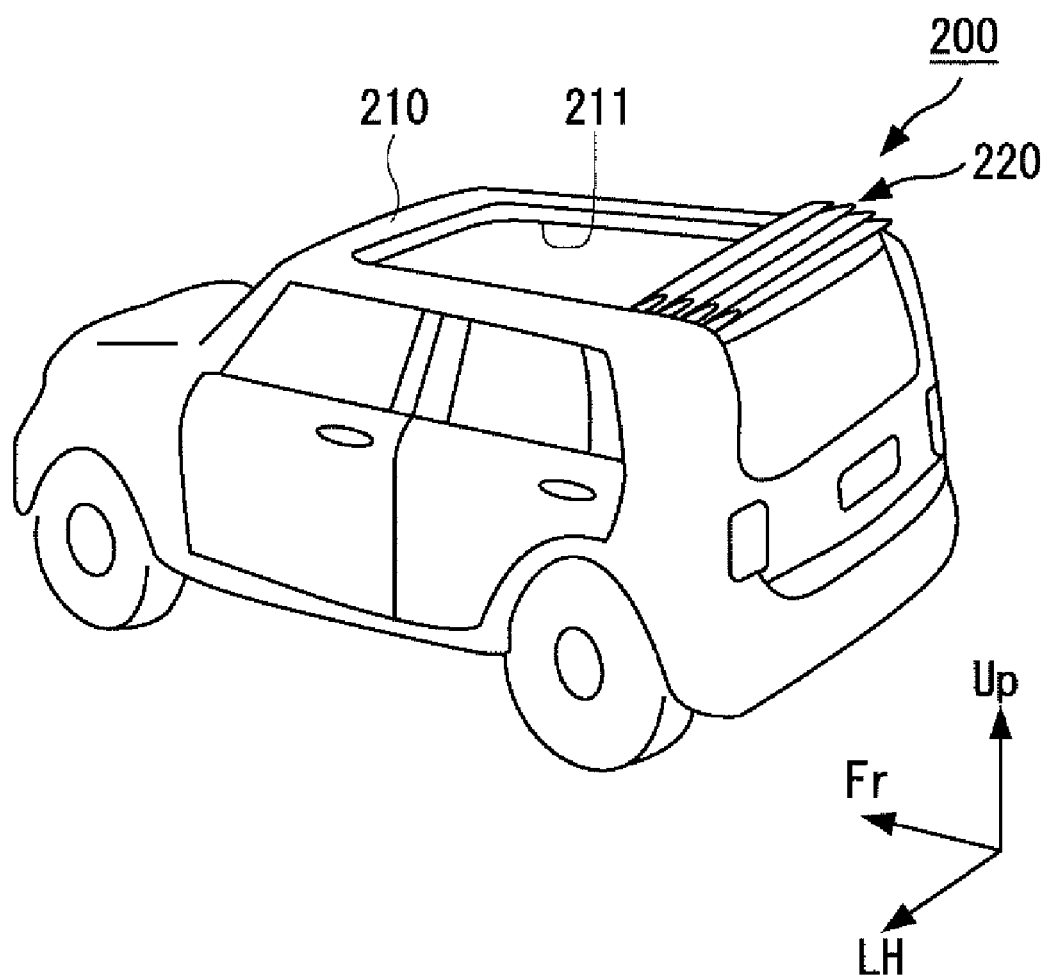
FIG. 19 is a perspective view of a conventional sliding roof type vehicle.

In addition, in the second embodiment, first hook members 121 are provided on both sides of the front edge of the cover 120, as shown in FIG. 18 (A), and the first hook members 121 are transferred toward the front or the rear side of the roof as a result of winding up or discharging of the wire 117 by the motor 116 integrated in the roof 111, and the opening 112 is thus closed or formed. The second hook member 118 mounted to the tip of the wire 117 is engaged in the first hook member 121. The first hook member 121 and the second hook member 118 are engaged in the longitudinal direction of the vehicle as shown by α in FIG. 18 (B). The shape and orientation of the hook constituting each hook member 118, 121 are determined so that the first hook member 121 is disengaged from the second hook member 118 when moved downward from the engaged position.

The sliding roof structure 101 of the second embodiment of this invention is described below.

In order to form the opening 112 in the roof 111, the front part of the cover is slid toward the rear side of the vehicle as in the case of conventional sliding roof type vehicles (FIG. 10). At this time, the cloth between the front edge and the rear edge of the cover is folded and placed on the tray for the cover 130. The retaining means 150 maintains the tray for the cover 130 at the first position (A). If a user operates an in-vehicle switch to wind up the wire 155 connected to the protruding piece 151 of the retaining means 150, the protruding piece 151 is retracted from the guide groove 141. Consequently, the convex 133 moves downward, allowing the tray for the cover 130 to move from the first position (A) to the second position (B).

With the sliding roof structure 101 thus configured, by forming the opening 112 in the roof 111, the folded cover 120 can be moved from the position on the roof 111 to inside the vehicle. Since the cover 120 does not remain on the roof 111, unlike conventional sliding roof structures, a large opening 112 can be formed. Furthermore, since the top edge of the rear door glass directly contacts the tray for the cover 130, the opening can be made even larger if the rear door glass is lowered.

As explained above, the present invention allows the cover, which is folded to form an opening in the roof, to be transferred from the top (roof) to inside the vehicle. Consequently, the cover does not occupy roof area, unlike conventional sliding roof structures, allowing the opening to be made larger and thus providing passengers with enhanced sense of openness.

Various embodiments are allowed without departing from the scope of the invention.

The invention claimed is:

1. A sliding roof structure for opening/closing an opening in a roof of a vehicle with a cover member comprising;
    a cover storage member which constitutes a rear end of the roof and stores the cover member, and
    a guide for transferring the cover storage member between a position at the rear end of the roof and a position inside the vehicle, and
    a stopper mechanism for maintaining the cover storage member at the rear end of the roof,
    wherein the cover member is stored in the cover storage member,
    wherein the cover storage member includes a motor for winding the cover member,
    wherein the guide is equipped with lifting/lowering rails installed between the position at the rear end of the roof and the position inside the vehicle,
    wherein the lifting/lowering rails are inclined so that the position inside the vehicle is nearer to the front than the position at the rear end of the vehicle,
    wherein the position inside the vehicle is arranged on a deck behind a rear seat,
    wherein the deck is provided with a concave for partially embedding the cover storage member.

2. A vehicle having a driving mechanism for the vehicle; and the sliding roof structure according to claim 1.

* * * * *